United States Patent [19]

Chyou et al.

[11] Patent Number: 5,274,994
[45] Date of Patent: Jan. 4, 1994

[54] PRESSURE WAVE MACHINE WITH INTEGRATED COMBUSTION

[75] Inventors: Yan-Pin Chyou, Dottikon, Switzerland; Tino-Martin Marling, Berau, Fed. Rep. of Germany; Erwin Zauner, Baden, Switzerland

[73] Assignee: Asea Brown Boveri Ltd., Baden, Switzerland

[21] Appl. No.: 11,686

[22] Filed: Feb. 1, 1993

[30] Foreign Application Priority Data

Feb. 17, 1992 [DE] Fed. Rep. of Germany ....... 4204678

[51] Int. Cl.⁵ .............................................. F02C 3/02
[52] U.S. Cl. ..................................... 60/39.45; 417/64
[58] Field of Search .................... 60/39.45; 417/64; 123/559.2

[56] References Cited

U.S. PATENT DOCUMENTS

| | | | |
|---|---|---|---|
| 2,675,173 | 4/1954 | Jendrassik | 417/64 |
| 2,697,593 | 12/1954 | Rydberg | 417/64 |
| 3,159,002 | 12/1964 | Spalding | 60/39.45 A |
| 3,234,736 | 2/1966 | Spalding | |
| 3,874,166 | 4/1975 | Kirchhofer et al. | 123/559.2 |
| 4,796,595 | 1/1989 | El-Nashar et al. | 417/64 |

FOREIGN PATENT DOCUMENTS

| | | |
|---|---|---|
| 0179233 | 4/1986 | European Pat. Off. |
| 0212181 | 3/1987 | European Pat. Off. |
| 0468083 | 1/1992 | European Pat. Off. |
| 2152775 | 4/1973 | Fed. Rep. of Germany |
| 2244666 | 3/1974 | Fed. Rep. of Germany |
| 1463516 | 11/1966 | France .................. 60/39.45 A |
| 458838 | 8/1968 | Switzerland |
| 1511469 | 9/1989 | U.S.S.R. ................. 417/64 |
| 1590693 | 9/1990 | U.S.S.R. ................. 417/64 |
| 0830741 | 3/1960 | United Kingdom .......... 60/39.45 A |

Primary Examiner—Richard A. Bertsch
Assistant Examiner—Michael I. Kockarov
Attorney, Agent, or Firm—Burns, Doane, Swecker & Mathis

[57] ABSTRACT

A pressure wave machine with integrated combustion has a cellular wheel (10) containing a number of cells (16) in which an always recurring ignition and combustion process takes place. To maintain this always recurring process, neither a supply of ignition energy from the outside nor a control intervention should be necessary. Hot-gas channels (18) are provided, by means of which hot gas is taken from one cell (16), in which the combustion step belonging to a cycle has been completed, and recycled to a cell (16) which contains the fuel/air mixture which is to be ignited.

6 Claims, 1 Drawing Sheet

PRESSURE WAVE MACHINE WITH INTEGRATED COMBUSTION

BACKGROUND OF THE INVENTION

Field of the Invention

The invention relates to a pressure wave machine with integrated combustion, having a cellular wheel which rotates between in each case one air-side and gas-side side part provided with inlet and outlet ports and has a number of cells in which an always recurring ignition and combustion process takes place, and having means for automatic ignition and combustion of the entering fresh gas mixture.

Discussion of Background

In EP-B1-0,212,181, a pressure wave machine, as a high-pressure compressor part of a gas turbine installation, has been proposed in which the high-pressure gas is generated by self-ignition of a fuel which in turn is injected or blown into the cellular rotor from fuel nozzles in a housing of the pressure wave machine in the region of the low-pressure channels. The self-ignition here takes place in the manner of detonation when the fuel/air mixture meets a compression wave arising in the region where the fuel is introduced. The pressure waves thus arising generate, on the one hand, high-pressure air, which is fed through a high-pressure air channel to a combustion chamber for generating driving gas for the gas turbine, in the corresponding regions of the rotor space.

SUMMARY OF THE INVENTION

Accordingly, one object of this invention is to provide a novel pressure wave machine, in which neither an ignition energy supply nor external ignition control interventions are necessary in order to maintain the continuous ignition and combustion process. In addition, the pressure wave machine should be capable of adapting itself to changed operating parameters, in particular to a change in speed of rotation. Finally, moving parts in the pressure wave machine are to be avoided.

According to the invention, this object is achieved in such a way that the said means are formed by channels, by means of which hot gas is taken from one cell in which the combustion step belonging to a cycle has been completed, and recycled to a cell which contains the gas/air mixture to be ignited. Preferably, a fuel feed line can be connected to the said channels for enriching the said hot gas. For the starting step, controllable means, in particular spark plugs or steadily pulsed pilot burners, are provided for igniting the fresh gas/air mixture. Preferably, one channel is provided in each case in both the air-side and the gas-side side part for feeding hot gas to the gas/air mixture, which is to be ignited, at both ends of a cell. This device has the following advantages:

The continuous ignition and combustion process is maintained automatically, i.e. independently, via these channels.
Owing to these channels, neither a supply of energy nor an external control intervention is necessary. A fuel addition in some cases is advantageous. An adaptation to changed operating parameters is not necessary.
The device does not require any moving parts.
Harmful or dead volumes are avoided.

BRIEF DESCRIPTION OF THE DRAWINGS

A more complete appreciation of the invention and many of the attendant advantages thereof will be readily obtained as the same becomes better understood by reference to the followed detailed description when considered in connection with the accompanying drawings, wherein.

DESCRIPTION OF THE PREFERRED EMBODIMENTS

Figure 1:
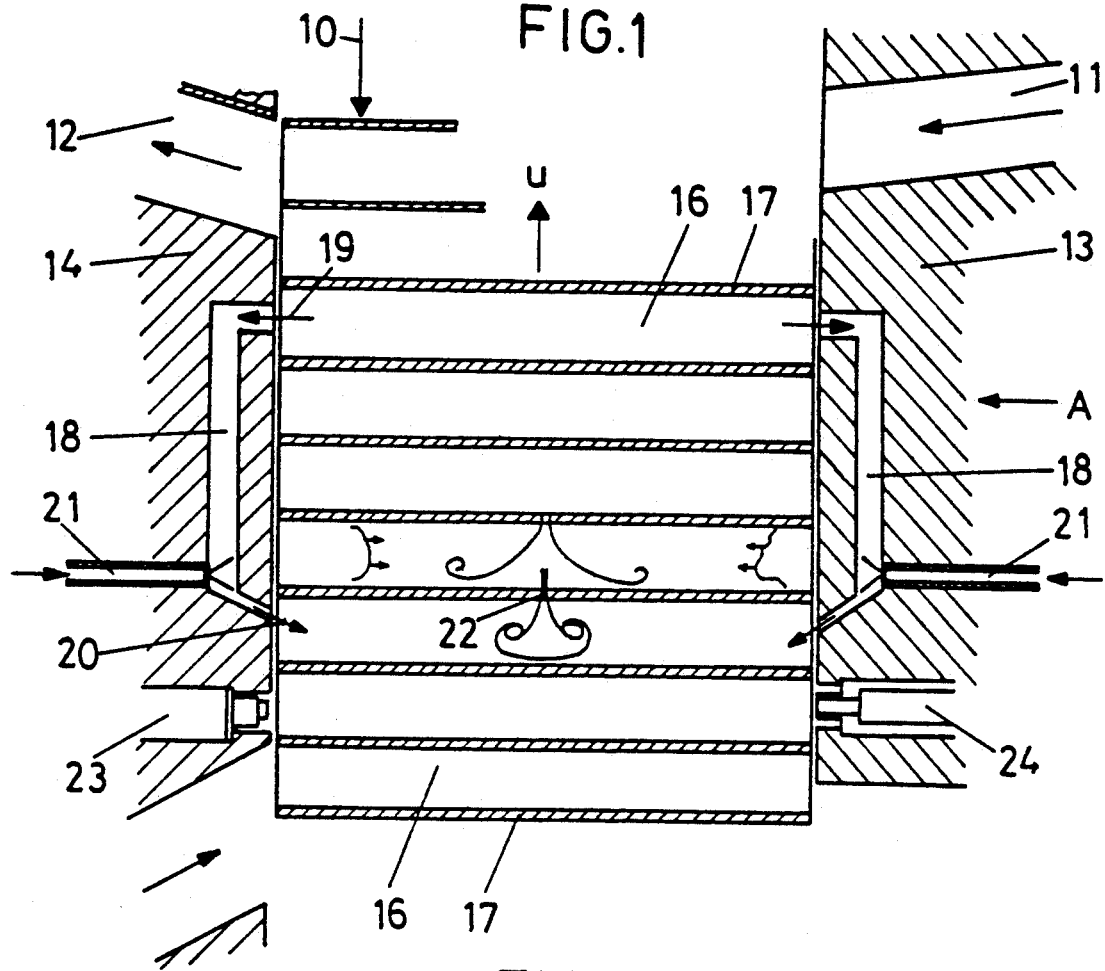
FIG. 1 shows a diagrammatic illustration of a pressure wave machine.
Figure 2:
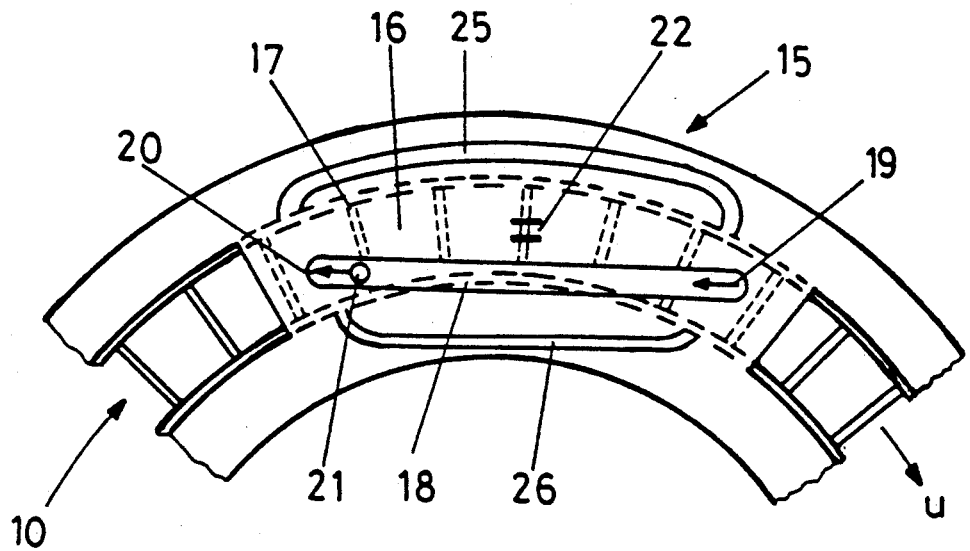
FIG. 2 shows a side view of the pressure wave machine shown in FIG. 1, as viewed in the direction of the arrow A.

Referring now to the drawings, wherein like reference numerals designate identical or corresponding parts throughout the several views, in FIG. 1, there is a cellular wheel 10 between an air-side side part 13 and a gas-side side part 14 which are each provided with inlet ports 11 and outlet ports 12. In FIG. 1, only one single inlet port 11 is shown in the air-side side part 13, and only one outlet port 12 is shown in the gas-side side part 14. These two side parts 13 and 14 belong to a stator housing 15 (see FIG. 2). As indicated in FIGS. 1 and 2 by arrows U, the cellular wheel 10 rotates relative to the two side parts 13 and 14 of the stator housing 15. The cellular wheel 10 has a number of cells 16 which are separated from one another by partitions 17. These cells 16 are open at both ends, so that a fuel/air mixture can enter cells 16 through the inlet port 11. As soon as this fuel/air mixture has been burnt in the cell 16 (described below) to give an exhaust gas, this exhaust gas can escape through the outlet port 12 of the side part 14. Hot-gas pipes or hot-gas channels 18 serve for igniting the fuel/air mixture. At the upper end 19 of these hot-gas channels 18, the exhaust gas formed by combustion of the fuel/air mixture can enter the hot-gas channel 18. At the lower end 20, hot exhaust gas from the hot-gas channel 18 can enter a cell 16 which is filled with a fuel/air mixture.

This exhaust gas present in the hot-gas channel 18 is capable of igniting the fuel/air mixture of a cell 16.

To these hot-gas channels 18, additional fuel lines 21 are connected, through which additional fuel can be fed via the hot-gas channels 18 to the cells 16, in order, if necessary, to influence the combustion process. If desired, holes 22 can be present in the partitions 17 between the cells 16. Through these holes, hot exhaust gas can pass from one cell 16 into a neighboring cell 16 which contains a fuel/air mixture. For starting the pressure wave machine described, for example a spark plug 23 or a pilot burner 24, or both, are present. By means of this spark plug 23 or this pilot burner 24, the fuel/air mixture present in the cell 16 can be ignited, as long as hot exhaust gases are not yet present in the hot-gas channels 18.

The mode of action of the pressure wave machine described here is as follows:

A fuel/air mixture can be fed to the cells 16 of the cellular wheel 10 through the inlet port 11 of the air-side side part 13. The cellular wheel 10 rotates in the direction of the arrow U. As soon as a cell 16 filled with a fuel/air mixture enters the region of the spark plug 23 or of the pilot burner 24, the fuel/air mixture can be ignited. The hot exhaust gas thus produced can enter the hot-gas channels 18 as soon as a cell 16, filled with hot exhaust gas, passes into the region of the upper ends 19 or ports of the hot-gas channels 18.

This high-pressure hot gas passes through the lower ends 20 or ports of the hot-gas channels 18 into a cell which is filled with a fresh fuel/air mixture, and can ignite this fuel/air mixture. After the pressure wave machine has been started, neither the spark plug 23 nor the pilot burner 24 are therefore necessary.

The lower ends 20 of the hot-gas channel are designed in the shape of a nozzle. The depth of penetration and the mixing time of the hot exhaust gas forming an ignition gas from the hot-gas channel 18 can be controlled by the selection of the nozzle diameter and by the positioning of these ends 20 and also by the selection of the inflow angle, whereby the ignition process can be influenced. Between the entry of the hot exhaust gases into the hot-gas channel 18 and the outlet of these hot exhaust gases from this hot-gas channel, the combustion of the fuel/air mixture takes place in the cells 16 of the cellular wheel 10.

In particular at part load of the pressure wave machine, it can be useful, in the case that lean mixtures are used, to add fuel to the hot exhaust gas in the hot-gas channels 18 through the additional fuel lines 21, thereby an after combustion process is initiated. As a result of the higher temperature thus produced and of the very active intermediates, the ignition is promoted.

The high-pressure hot gas can be passed through holes 22 in the partitions 17 directly into the neighboring cell 16 filled with a fuel/air mixture. The mixing time and ignition delay time can be influenced by the diameter of these holes 22 and by the number of such holes 22. The ignition delay time must here in every case be shorter than the time during which the cellular wheel 10 rotates by the width of one cell 16.

Hot-gas channels 18 and holes 22 can be combined with one another, i.e. in addition to the injection of hot gas through the channels 18, hot gas can pass through the holes 22 into the cell 16. Under some circumstances, this can have advantages. Large-caliber swirls and higher turbulences arise in the central region of the cell 16, which is not reached by the injection from the side through the channels 18, and the flame propagation is assisted in this way.

In FIGS. 1 and 2 of the drawing, two hot-gas channels 18 are shown on the two sides of the cellular wheel 10. Of course, these channels can also be located radially above or inside the cellular wheel 10 in the stator housing 15, as indicated by the channels 25 and 26.

One or more of the said hot-air channels 18, 25 or 26 will be provided as required.

In the case of additional fuel injection via the lines 21, moreover, a liquid fuel can be provided without having to accept losses in the quality of mixture formation. The liquid-fuel mist is mixed with the hot gas flowing through the line 18, the high temperature of this hot gas ensuring that complete gasification of the liquid fuel injected here takes place. It is self-evident that the quantity of fuel injected preferably at the end of the hot-gas line 18 must be in relation to the mass of the hot gases recycled via this line. With this configuration, the unit can also be operated as a dual-fuel installation.

Obviously numerous modifications and variations of the present invention are possible in the light of the above teachings. It is therefore to be understood that, within the scope of the appended claims, the invention may be practiced otherwise than as specifically described herein.

What is claimed as new and desired to be secured by LETTERS PATENT of the United States is:

1. A pressure wave machine with integrated combustion, comprising:
   a cellular wheel rotatably mounted between an air-side side part and a gas-side side part, each side part being provided with inlet and outlet ports;
   the cellular wheel having a number of cells in which a continuous ignition and combustion process takes place;
   means for automatic ignition and combustion of an entering fresh gas mixture in each cell, wherein the means are formed by channels for conducting hot gas from one cell, in which the combustion step belonging to a cycle has been completed, to a cell which contains a fuel/air mixture to be ignited, the cells having at least one hole which communicates with an adjacent cell for conducting hot gas to the adjacent cell, and wherein a fuel feed line is connected to the said channels for enriching the hot gas with fuel.

2. The pressure wave machine as claimed in claim 1, wherein, for the starting step, controllable means in particular spark plugs or steadily pulsed pilot burners are provided for igniting the fresh fuel air mixture.

3. The pressure wave machine as claimed in claim 1 wherein at least one channel is arranged in one of the side parts and is located next to the cellular wheel in order to feed hot gas to the fuel/air mixture which is to be ignited.

4. The pressure wave machine as claimed in claim 1 wherein one channel is provided in each case in both the air-side and gas-side side parts for feeding hot gas to the fuel/air mixture, which is to be ignited, at both ends of a cell.

5. The pressure wave machine as claimed in claim 1 wherein at least one channel is arranged in a stator housing and is located radially outside or inside the cellular wheel (10) for feeding hot gas to the fuel/air mixture which is to be ignited.

6. The pressure wave machine as claimed in claim 1, wherein the fuel injected via the hot-gas channels is a liquid fuel.

* * * * *